United States Patent Office 2,909,637
Patented Oct. 20, 1959

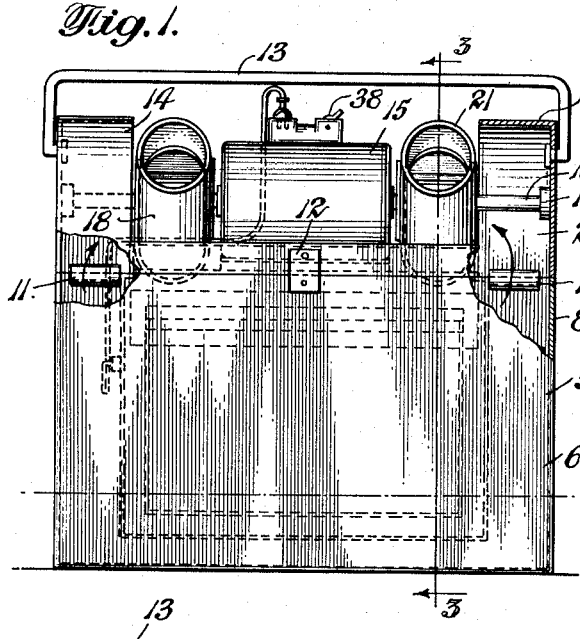
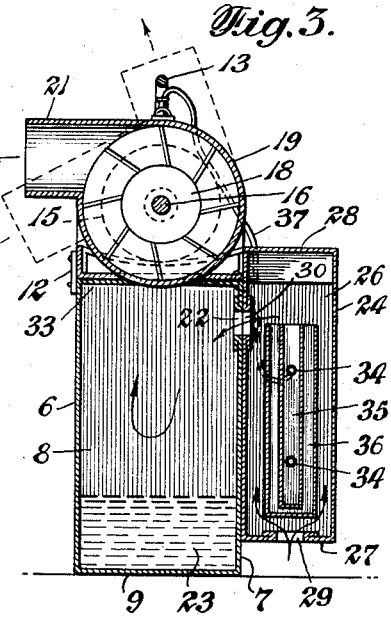
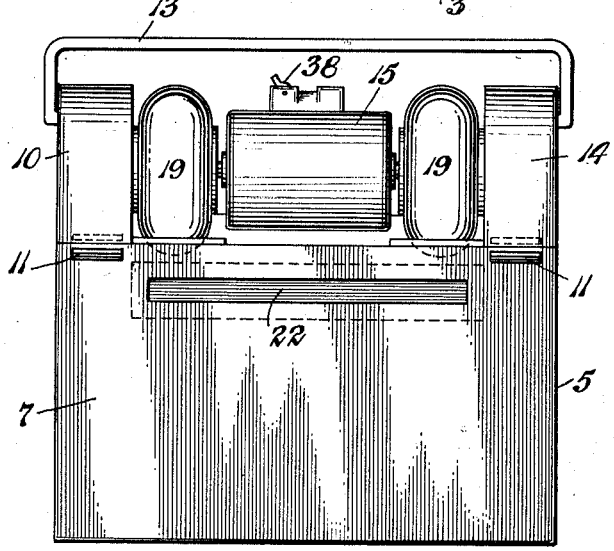
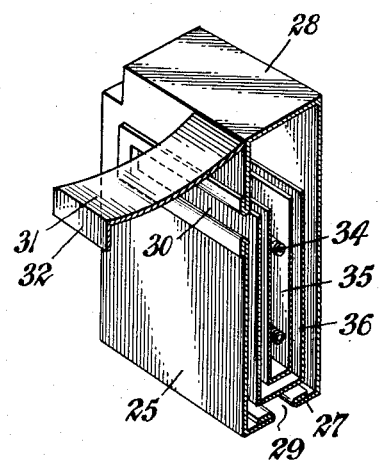
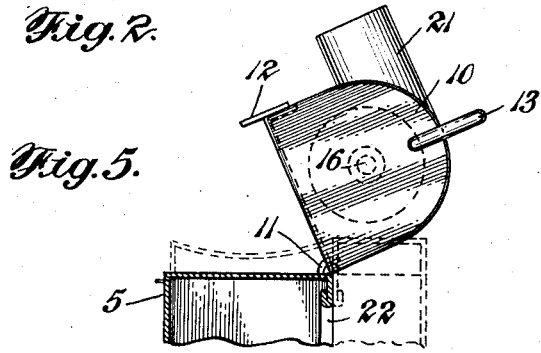

2,909,637

METHOD AND APPARATUS FOR TREATING AIR IN HOT AND COLD WEATHER

William R. Mobley, Miami, Fla.

Application January 3, 1956, Serial No. 557,105

6 Claims. (Cl. 219—39)

This invention relates to a method and means for treating air to provide comfort in both hot and cold weather.

It is an object of the invention to provide means for producing in a ventilated room a zone of purified air in a state of expansion that will more readily absorb the heat and moisture from the body of a person within the zone of treated air.

A further object of the invention is to provide means for heating and treating the air in a closed room in cold weather.

A still further object of the invention resides in a method for conditioning air that consists in creating and maintaining a low pressure zone above the surface of a body of liquid in an enclosed housing, passing a continuous stream of air through said low pressure zone, thereby lowering the temperature of said liquid and utilizing said lower temperature and said low pressure zone to contract the air in said air stream, passing the contracted air from said low pressure zone into a high pressure zone and continuously discharging said stream of contracted air from said high pressure zone into a ventilated room to create and maintain a comfort zone of expanding air to absorb the heat and moisture from the body of a person within said comfort zone.

A still further object of the invention is to provide a means for directing the air downward or upward from a higher or lower position.

A still further object of the invention resides in a method for treating air that consists in heating and expanding an air stream in a high temperature zone, passing the heated air into a low pressure zone maintained above the surface of a body of liquid in a housing, thereby contracting and correcting the humidity of the heated air, passing the contracted heavy air from the low pressure zone to a high pressure zone and then discharging the said heavy contracted air into a room to create and maintain a warm comfort zone at the lower levels of the room in cold weather.

A still further object of the invention resides in providing an apparatus for heating and treating air wherein the heating means may be detachable from the treating apparatus or it may be permanently incorporated in the treating unit or it may be used in permanent heating installations in combination with the treating method.

Another object of the invention resides in providing apparatus for carrying out the methods of treating the air to create warm or cool comfort zones in a room, which apparatus is simple and durable in construction, reliable and efficient in operation and inexpensive to manufacture.

Other objects and advantages of the invention will be apparent during the course of the following description.

In the accompanying drawing forming a part of this specification and in which like numerals are employed to designate like parts throughout the same, Fig. 1 is a front elevational view of the apparatus;
Fig. 2 is a rear view of the same;
Fig. 3 is a vertical section taken on line 3—3 of Fig. 1;
Fig. 4 is a vertical sectional perspective view of the heating chamber; and,
Fig. 5 is an end view of the cover in raised position.

Referring to the drawing, wherein for the purpose of illustration, a preferred embodiment of the invention is shown, the numeral 5 denotes a casing or housing of rectangular shape having front and rear walls 6 and 7, opposed end walls 8 and bottom wall 9. A cover 10 of substantially semi-circular shape in cross section is hingedly connected to the upper edge of the rear wall 7 by arcuate hinge plates 11 removably fitted in openings in the back wall. The cover is normally held in a closed position by a latch 12 attached to the front wall and a handle 13 attached to the ends of the cover serves as a means for carrying the apparatus from place to place and also for swinging the cover to an open position. The central portion of the cover is cut-away to provide an opening 14 and disposed within the opening is an electric motor 15 having its shaft 16 journaled in bearings 17 attached to the ends of the cover. Rotary blowers 18 are mounted on shaft 16 at opposite ends of the motor, each blower being enclosed in a circular casing 19 having communication with the space 20 in each end of the cover. The blower casings 19 are each rotatably mounted on motor shaft 16 to permit the casings to be turned for directing the air discharge nozzles 21. I preferably mount the blower assembly consisting of motor 15 and casings 19 to be supported by the upper ends of the walls 6 and 7 of the housing as shown in Fig. 3. The complete blower assembly supported on said walls is rotatable with the lower edges of the housings 19 relative to housing 5 to direct the discharge of the air from the nozzles 21 upward or downward. Upon rotation of the blowers air is drawn into the housing through the elongated opening 22 in the back wall 7 adjacent its upper edge and upon entering the housing forms a low pressure zone above the surface of the liquid 23, such as water, deposited in the lower portion of the housing. The stream of air circulating through the low pressure zone in the housing is drawn from the housing into the cover end spaces 20 and enters the blowers where it is discharged from the nozzles 21 into the room creating a comfort zone of expanding air that absorbs the heat and moisture more readily from the body of a person within the comfort zone. When the elongated opening 22 is eliminated the air passes into the low pressure area around the motor between the front and rear walls 6 and 7 into said area above the water 23; wherefrom it is collected by the blower wheels and discharged from the nozzles 21 under pressure above atmospheric.

In cold weather a heater is or may be employed in conjunction with the apparatus and includes a casing 24 of rectangular shape having side walls 25, and walls 26, a bottom wall 27 and top wall 28. The bottom wall is provided with an inlet opening 29 for the admission of air and one of the side walls 25 is provided with an elongated outlet opening 30 adapted to register with the inlet opening 22 in the back wall of housing 5 providing communication between the casing and housing. A lateral extension 31 extends from the center of the top wall 28 across the top of the housing 5 and is arcuate shape to provide a seat for the motor 15 when the cover of the housing is closed. The free end of the extension 31 has a depending flange 32 that rests on a cross member 33 in the center of the top of housing 5. When the cover 10 is raised and swung rearwardly the heater casing 24 may be readily removed. Disposed within the heater casing 24 are electric heating elements 34 which are confined within a U-shaped member 35 nested in spaced relation within and to another U-shaped member 36 around which the stream of air flows in passing through the heater casing. The heating elements are connected by wire 37 to a suitable source of electric current and a switch 38 interposed in the circuit controls the flow of electric current to the motor 15 and heating elements.

In operation, the flow of air whether heated or unheated, enters the housing 5 above the surface of the liquid 23. The flow of air through the housing 5 creates a low pressure area above the surface of the liquid through which the air in passing in direct contact with the liquid is contracted and the air is then compressed in a high pressure zone at the ends of the cover 10 by the blowers 18 and thereby discharged from the nozzles 21 under pressure above atmospheric into a room, thus creating a zone of air in a state of expansion which will absorb the heat and moisture from the body of a person within the zone of expanding air.

If desired, the cover 10 may be eliminated and the casing constructed as a single unit with a blower assembly, including motor 15 and the blower casings 19, removable from the top of the unit casing 5. Further the elongated air inlet opening 22 may be eliminated so as to pass the incoming air downwardly between the blower casings 19 and around the motor 15 into the low pressure zone immediately above the confined liquid or water 23.

Having thus described my invention it is to be understood the form of the invention herein shown and described is to be taken as a preferred example of the same, and changes in the shape, size and arrangement of the parts may be made without departing from the spirit of the invention.

Having disclosed and described my invention, I claim:

1. Means for treating air to create and maintain a comfort zone thereof in a ventilated room or enclosure, comprising a substantially closed and portable rectangular casing having front and rear walls and opposed end walls and an elongated horizontal air inlet opening in the upper end of said rear wall, a hinged cover member on said casing having closed end walls, a motor housed within said cover and having a shaft journaled in said end walls thereof, a pair of blowers secured to said motor shaft and having blower housings provided with air discharge openings supported by said casing, said blower housings being journaled on said motor shaft for rotation thereabout in vertical planes, the spaces between said blower housings and said cover end walls defining vertical passages communicating with the interior of said casing, and a body of liquid in the bottom of said casing setting off thereabove a low sub-atmospheric pressure zone communicating axially with said blowers for admitting thereto air drawn through said inlet opening and cooled by surface contact with and evaporation of said liquid without breaking the surface tension thereof, said blowers creating a zone of high pressure within the blower housings for compressing the treated air admitted from said low pressure zone and propelling the same under super-atmospheric pressure and in a state of expansion through said discharge openings into said comfort zone.

2. Means for treating air to create and maintain a comfort zone thereof in a ventilated room or enclosure, comprising a substantially closed and portable rectangular casing having front and rear walls and opposed end walls and an elongated horizontal air inlet opening in the upper end of said rear wall, an intermediately cut-away cover member hingedly secured to said casing and having closed end walls, a motor disposed in the cut-away portion of said cover and having a shaft journaled in said cover end walls, a pair of blowers secured to said shaft at opposite ends of said motor and including blower housings having air discharge openings therein rotatably supported by said casing, said blower housings being journaled on said motor shaft for rotation thereabout in vertical planes, the spaces between said blower housings and the end walls of said cover defining vertical passages communicating with the interior of said casing, and a body of liquid in the bottom of said casing beneath said air inlet opening and setting off thereabove a low sub-atmospheric pressure zone communicating axially with said blowers for admitting thereto air drawn through said inlet opening and cooled by surface contact with and evaporation of said liquid without breaking the surface tension thereof, said blowers creating a zone of high pressure within the blower housings for compressing the treated air admitted from said low pressure zone and propelling the same in a condition of expansion under super-atmospheric pressure through said discharge openings into said comfort zone.

3. Means for treating air as defined in claim 1 wherein a housing enclosing an electrical heater having resistance heating elements is mounted on the exterior of the rear wall of said casing in communication with said inlet opening, said heater housing having an air admitting aperture communicating with a tortuous air conducting passage surrounding said heating elements and communicating with said elongated air inlet opening of said casing, whereby to create a zone of high temperature for heating and expanding atmospheric air prior to admitting the same to said low pressure zone created by said blowers above the surface of said liquid to humidify and contract the air drawn into said blowers.

4. Means for treating air as defined in claim 2 wherein rotation of one or both of said blower housings and their air discharge openings on and relative to said casing, causes the treated air to be discharged into said comfort zone at any desired angle to the horizontal in one or more vertical planes.

5. The method of treating air in a portable unit comprising creating a substantially closed sub-atmospheric low pressure zone immediately above and coextensive with the surface of a confined body of liquid in a quiescent state, drawing air into said zone and impinging the same against said liquid throughout its surface area without breaking the surface tension thereof to cool and contract the said air by contact with and partial evaporation of said liquid, compressing the cooled contracted air within a superposed communicating high pressure zone and propelling under pressure the compressed air in a state of expansion and in a confined discharge stream from said high pressure zone into a room or enclosure at varying angles to the horizontal to create and maintain a comfort zone therein.

6. The method of treating air in a portable unit comprising passing air into and through a high temperature zone to heat and expand the air, creating a substantially closed sub-atmospheric low pressure zone immediately above and horizontally coextensive with a confined body of cooling liquid in the quiescent state, drawing air into said low pressure zone and impinging the same against said liquid throughout its surface area without breaking the surface tension thereof to cool and contract the air by contact with and partial evaporation of said cooling liquid, collecting and compressing the cooled contracted air within a superposed communicating high pressure zone greater than atmospheric, and propelling under pressure the compressed air in a condition of expansion and in a plurality of confined discharge streams from said high pressure zone into a room or enclosure at varying angles to the horizontal to create and maintain a comfort zone therein.

References Cited in the file of this patent

UNITED STATES PATENTS

| | | |
|---|---|---|
| 1,073,095 | Cramer | Sept. 16, 1913 |
| 1,115,767 | Bain | Nov. 3, 1914 |
| 1,133,371 | Du Commun | Mar. 30, 1915 |
| 1,990,468 | Bridges | Feb. 12, 1935 |
| 2,054,292 | Maddocks | Sept. 15, 1936 |
| 2,199,840 | Royall | May 7, 1940 |
| 2,282,373 | Minckler et al. | May 12, 1942 |
| 2,300,580 | Loprich | Nov. 3, 1942 |
| 2,417,010 | Mobley | Mar. 4, 1947 |